March 3, 1931. J. G. RITTER 1,794,983
WELDING ELECTRODE
Filed June 29, 1928
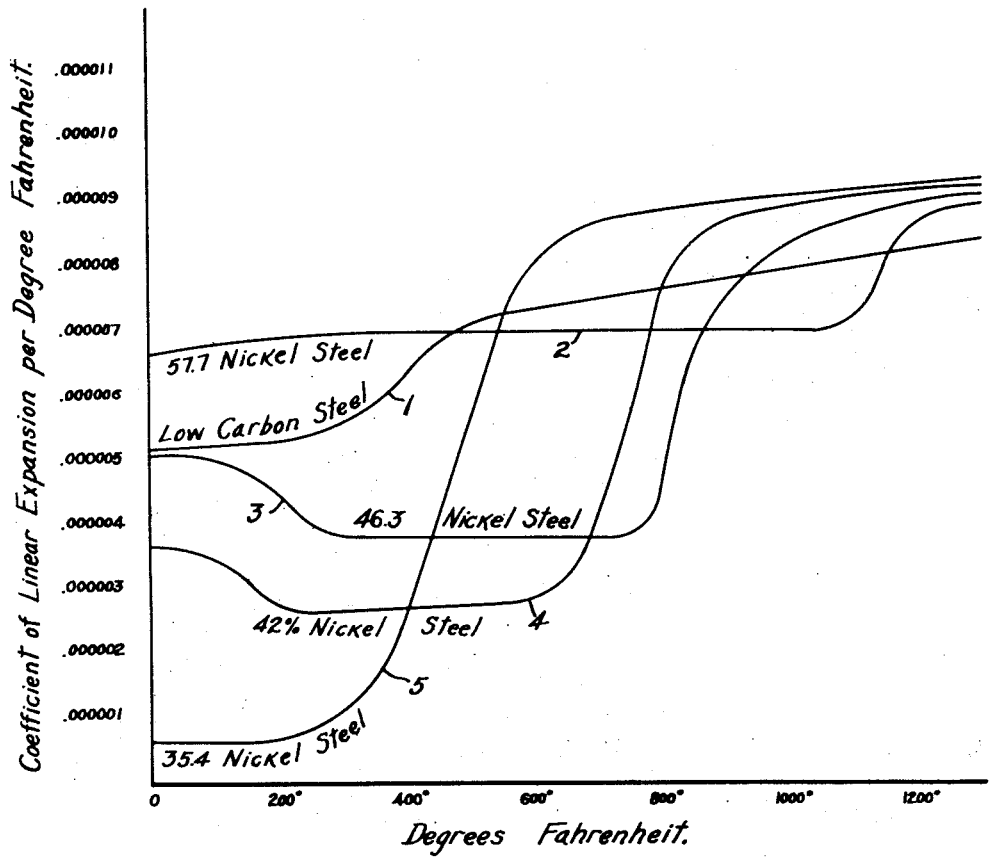
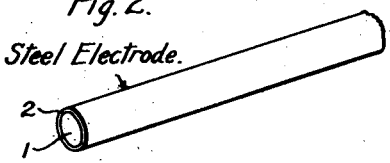
INVENTOR
John G. Ritter.
BY
ATTORNEY Patented Mar. 3, 1931

1,794,983

UNITED STATES PATENT OFFICE

JOHN G. RITTER, OF NORWOOD, PENNSYLVANIA, ASSIGNOR TO WESTINGHOUSE ELECTRIC & MANUFACTURING COMPANY, A CORPORATION OF PENNSYLVANIA

WELDING ELECTRODE

Application filed June 29, 1928. Serial No. 289,097.

My invention relates to alloys and more particularly to alloys adapted to be utilized as fusible electrodes or as filling material for electric-arc welding.

An object of my invention is to provide a welding electrode having the characteristic of becoming very fluid when fused and having the property of readily alloying, penetrating or cementing contacting surfaces of various base metals.

Another object of my invention is to provide a welding electrode which is durable and highly resistant to arcs.

Another object of my invention is to provide a welding electrode which deposits a metal having a low coefficient of expansion.

A further object of my invention is to reduce the residual strains in arc-welded structures by depositing electrode-material having a low thermal conductivity and a low coefficient of expansion below the stress-relieving temperature, sometimes referred to as the low annealing temperature.

It is well known that the degree of freedom of molecular movement in a given metal is a function of its temperature. Use is made of this phenomenon for the purpose of relieving strains in distorted or over-stressed structures. The temperature to which a strained metal must be heated to benefit from the increased freedom of molecular movement varies with the nature of the material, degree of over-stress, the time at which it is maintained at a given temperature and other factors.

In carbon-steel structures, substantially complete stress relief may be secured by heating stressed metal to a stress-relieving or low annealing temperature in the neighborhood of 700° Fahrenheit. The temperature at which relief is obtained depends somewhat upon the length of time available for molecular adjustment. At temperatures approximating 700° F., only a few seconds may be necessary, whereas, at temperatures approximating 200° F., a few hours may be required to relieve internal stress.

Heretofore, ordinary carbon steel has been employed for the fusible electrode or filling material in the joining of metal structures by the metallic-electrode arc-welding process. In this process, metal is deposited in a fluid state from a low-carbon-steel electrode upon and between the scarfed edges of the structures to be united. During the period in which the deposited metal is cooling to normal or atmospheric temperature, the deposit tends to shrink by reason of its large positive temperature coefficient of expansion. Since the joint members often occupy a fixed relative position, either by reason of their massive proportions or the nature of the supporting structure, this tendency of the deposited metal to shrink is resisted. The resistance to shrinkage builds up internal strains which serve to reduce the ultimate load which the structure is capable of supporting and may even cause the premature failure of the welded device.

I have found that such strains are caused by the accumulation of unrelieved stresses, and that they may be reduced in magnitude by the use of an electrode or filling metal having a low coefficient of expansion throughout the temperature range over which such metal may tend to contract.

The ideal deposit metal is one having a substantially zero temperature coefficient of expansion throughout the cooling range, or even, for some purposes, a negative coefficient, where internal compressional stresses may be utilized to increase the ultimate tensile strength of the joint. However, I have discovered that most of the advantages of the ideal deposit material may be obtained by the use of a weld-filling metal which has a low coefficient of expansion, particularly in the region of, and below, the stress-relieving or low annealing temperature, and which has the further property of cooling at a relatively slow rate.

In embodying the subject-matter of my invention in practical form, I utilize, as a welding electrode, an alloy consisting chiefly of iron (with its normal impurities) and one or more refractory metals or metals having a melting temperature greater than 2600° F., such as nickel, cobalt, chromium, molybdenum or tungsten, capable of reducing both the coefficient of expansion of iron and its thermal conductivity.

The effect of the reduction in coefficient of expansion is to decrease the tendency towards shrinkage while the metal deposited from my electrode cools, and the effect of the reduction in thermal conductivity is to decrease the cooling rate and thus increase the time available for molecular re-adjustment in the region of the stress-relieving temperatures.

In order that the lowered thermal conductivity of my electrode shall not limit me in the choice of welding-current values, by reason of its inherent low electrical conductivity, I may increase the electrical conductivity of the welding rod from the arc end to the point of contact with current-conveying members by coating its surface with electroplated copper or aluminum.

Although I may use alloy iron with a mixture of refractory metals, for my preferred electrode materials, I employ alloys of the iron-nickel system having a nickel content varying from approximately 35% to 55%. Such alloys are capable of welding the ordinary metals because of their fluidity, slow rate of oxidation and high penetrating power at the welding temperature, and, furthermore, by reason of their low coefficient of expansion below the low annealing temperature and a thermal conductivity approximating one-seventh that of carbon steel, they are capable of forming welded joints having a negligible internal stress.

The expansion characteristics of my preferred electrode material, which are substantially also those of the metal deposited therefrom, will be readily understood by referring to the accompanying drawing, wherein Figure 1 is a curve chart showing a comparison of a carbon steel and a number of nickel-steel allows, and Fig. 2 represents a nickel steel rod 1 having a coating of copper 2 electroplated thereon.

The ordinates of the curve chart represent coefficients of thermal expansion, and the abscissæ represent degrees Fahrenheit. Curve 1 represents a low-carbon steel; curve 2 represents 57.7% nickel-steel; curve 3 represents 46.3% nickel-steel; curve 4 represents 42% nickel-steel and curve 5 represents 35.4% nickel-steel.

These curves show an important difference in the expansion characteristics of carbon steel and the nickel-steel alloys above and below a low annealing temperature corresponding to about 700° Fahrenheit. Above this temperature, the coefficients of expansion are about the same order of magnitude, whereas, below 700° Fahrenheit, the unit expansion values for my preferred alloys are much lower than those for carbon steel. This characteristic is particularly marked in the case of the 42% nickel-steel alloy, the average unit expansion of which, from normal temperature to 700° Fahrenheit, is about $3 \times 10^{-6}$, whereas, that for carbon steel for the same temperature range is about $6.2 \times 10^{-6}$. It is apparent that the 42% nickel-steel alloy will shrink a smaller amount, upon cooling from its low annealing temperature, than will carbon steel, so that less strains will accumulate when using my preferred alloy as the filling metal.

I have demonstrated the practical advantage to be derived from the use of my alloy, by depositing, on separate steel bars, each having a thickness of 5/16 inch, a width of 1 ½ inches and a length of 15 inches, a layer of metal 8 inches long and 3/16 inch wide from a 0.15 percent carbon-steel electrode and a similar layer from a 42% nickel-steel electrode. As a result of the very substantial deposit from carbon steel, the base plate on which it was formed warped to such an extent as to cause the end of the plate to curl up a distance of 4/16 of an inch, beyond the position assumed by the end of the plate having the nickel steel deposit. It is, therefore, obvious that the residual strains in the metal deposited from my preferred electrode are of a lower order of magnitude than those present in metal deposited from carbon-steel electrodes.

Although I have described specifically an electrode of iron alloyed with nickel, it is to be understood that this example is merely illustrative of my invention and does not define the scope thereof. It is obvious that many materials, some of which are set forth in the specification, are suitable for use in producing electrodes in accordance with the present invention, and I claim the invention broadly, except as limited by the claims appended hereto.

I claim as my invention:

1. A welding electrode composed of an alloy containing 65 to 45% iron and minor impurities and 35 to 55% nickel.

2. A welding electrode composed of an alloy containing approximately 58% iron and minor impurities and approximately 42% nickel.

3. A welding electrode composed of a nickel-iron alloy containing substantially 42% nickel and 58% iron and having a low coefficient of linear expansion.

4. A welding electrode composed of a nickel-iron alloy containing approximately 42% nickel and having a low coefficient of linear expansion between 0° Fahrenheit and 700° Fahrenheit.

5. A welding electrode composed of an alloy containing 65 to 45% iron and minor impurities and 35 to 55% nickel and having its surface coated with a metal of high electrical conductivity.

6. A welding electrode composed of an alloy containing 65 to 45% iron and minor impurities and 35 to 55% nickel and having its surface copper plated.

7. A copper plated iron-base welding electrode containing 35 to 55% nickel and having a coefficient of expansion less than low carbon steel in the region of and below the low annealing temperature.

8. The method of producing a welding joint substantially free from residual stresses consisting in depositing a filling metal having a low coefficient of expansion in the region of and below its low annealing temperature.

In testimony whereof, I have hereunto subscribed my name this 23rd day of June, 1928.

JOHN G. RITTER.